March 21, 1961

P. G. HÄRTER 2,975,688

LOCKING MEANS FOR THE SHUTTER ACTUATING MECHANISM
OF A DETACHABLE LENS MOUNT CAMERA

Filed April 15, 1957

PAUL G. HÄRTER
INVENTOR.

BY

United States Patent Office 2,975,688
Patented Mar. 21, 1961

2,975,688

LOCKING MEANS FOR THE SHUTTER ACTUATING MECHANISM OF A DETACHABLE LENS MOUNT CAMERA

Paul G. Härter, Stuttgart, Germany, assignor to Eastman Kodak Company, Rochester, N.Y., a corporation of New Jersey Filed Apr. 15, 1957, Ser. No. 652,924

Claims priority, application Germany Sept. 22, 1956

4 Claims. (Cl. 95—11)

This invention relates generally to photographic cameras, and more specifically to a camera light-trap mechanism actuable by a detachable lens mount to releasably lock a shutter actuating mechanism.

In a photographic camera of the type employing a detachable lens mount, removal of the lens mount normally exposes the light-sensitive film to light radiation. Accordingly, light-trap means are needed to protect the film from exposure and fogging. In addition, locking means are needed to prevent operation of the shutter actuating mechanism while the lens mount is removed from the camera. If this shutter locking means is not incorporated in the camera, the operator is likely to intentionally or accidentally depress the shutter release button while the lens amount is removed actuating the double exposure prevention mechanism of the camera. This would, of course, prevent further depression of the shutter release button, even after the lens mount is reattached. To release the double exposure prevention mechanism, the operator must advance the film another picture frame resulting in a considerable loss of film. Also, where the camera employed is the type in which the film transport mechanism simultaneously advances the film and cocks the shutter, further difficulties are encountered. If the lens mount is attached to the camera with the between-the-lens shutter in a cocked position, the operator is unable to advance the film until the shutter is released. Since the shutter release cannot be depressed because of the aforementioned double exposure prevention mechanism, the operator must remove the lens mount, advance the film one frame and then reattach the lens mount. This is highly inconvenient in addition to being time consuming. Most of the shutter locking mechanisms used heretofore to eliminate these difficulties have been of relatively complicated construction containing a substantial number of moving parts. This, of course, greatly increases the cost of manufacture and substantially reduces the reliability of the mechanism.

Therefore, one of the objects of the present invention is to provide an improved locking means for the shutter actuating mechanism of a detachable lens mount camera that is more reliable, constructed of fewer parts and more economical to manufacture than prior known mechanisms.

Another object of the invention is the provision of an improved detachable lens mount camera having a light-trap mechanism adapted to releasably lock a shutter actuating mechanism carried by the camera.

Objects and advantages other than those set forth above will be apparent from the following description when read in connection with the accompanying drawing, in which.

Figure 2:
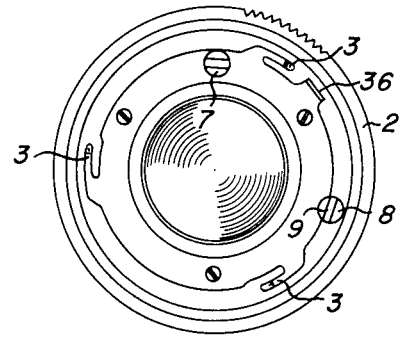
Fig. 2 is a rear elevation view of the lens mount.
Figure 3:
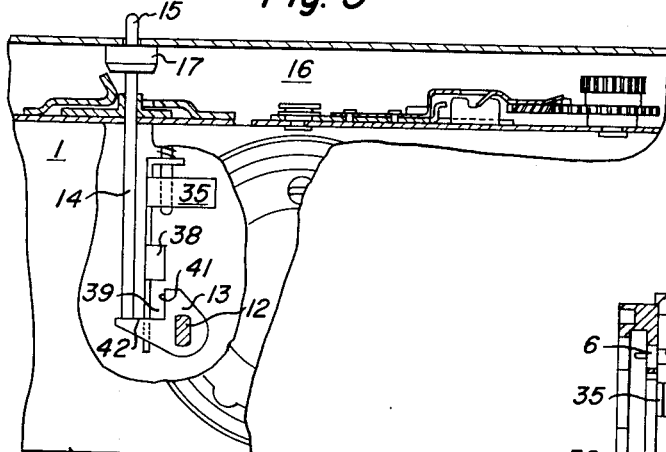
Fig. 3 is a view similar to Fig. 1 with a sectioned portion showing the double exposure prevention mechanism and another portion broken away to show the shutter actuating and light-trap mechanisms.
Figure 5:
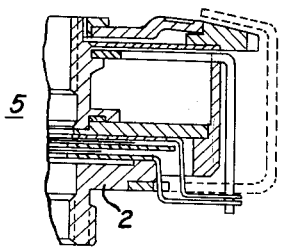
Fig. 5 is a fragmentary section view showing details of the between-the-lens shutter mechanism.

As shown in the drawings, this invention is illustrated as applied to a camera body 1 having a detachable lens mount 2. The lens mount 2 is attached to the camera body 1 by a suitable bayonet connection comprising spring fingers 3 carried by the lens mount adapted to pass through bayonet slots 4 formed by the camera body. The lens mount 2 is locked to the camera body 1 by rotating the lens mount in a clockwise direction as is well known. The lens mount 2 is of a known type having a between-the-lens Deckel shutter mechanism 5 as shown in Fig. 5. The shutter mechanism 5 is essentially as shown and described in British Patent No. 769,086, although any other suitable type of between-the-lens shutter mechanism can be used. Aligned shafts 6, 7 are provided by the camera body 1 and lens mount 2 respectively having coupling means at their ends for connecting the film transport mechanism of the camera, not shown, to the shutter cocking mechanism of the between-the-lens shutter 5 for cocking the shutter while advancing the film as is well known. The shaft 7 carried by the lens mount 2 corresponds to the cocking shaft 14 disclosed in the British patent. A shutter release shaft 8 as seen in Fig. 2, corresponding to the shaft in the British patent to which the release member 92 is mounted, has a slot 9 at one end adapted to engage a lip 11 formed by one end of an axially aligned shaft 12 carried by the camera body 1. A shutter actuating mechanism is carried by the camera and includes a dog member 13 rigidly attached to one end of the shaft 12 and engageable by an end of a reciprocally movable plunger 14 carried by the camera body 1. The opposite end of the plunger 14 extends through the camera body 1 to form a shutter release button 15. When the lens mount 2 is attached to the camera body 1, depression of the plunger 14 causes the dog member 13 and shaft 12 to move in a counterclockwise direction as seen in Fig. 3 releasing the cocked shutter mechanism in a well-known manner. Depressing the plunger 14 further actuates a double exposure prevention mechanism 16 as seen in Fig. 3 of the type disclosed and described in U.S. Patent No. 2,227,964. The flange 17 of the plunger 14 corresponds to the cam 64 of Patent 2,227,964. Although this particular type of mechanism 16 is shown, it is readily apparent that any well-known type of double exposure prevention device could be used.

Figure 1:
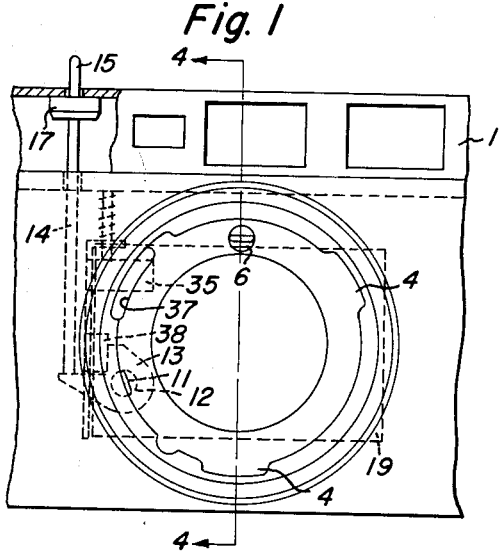
Fig. 1 is a fragmentary front elevation view of a detachable lens mount camera with the lens mount removed from the camera body.
Figure 4:
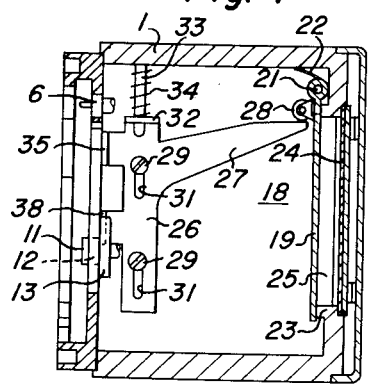
Fig. 4 is a section view taken along line 4—4 of Fig. 1.

In photographic cameras having a lens mount 2 provided with a between-the-lens shutter 5, removal of the lens mount exposes the light-sensitive film 24 carried by the camera body 1. To prevent the exposure or fogging of the film 24 upon removal of the lens mount 1, a light-trap mechanism 18 is provided comprising a rectangularly shaped flap member 19 pivotally mounted along one edge to a shaft 21 carried by the camera body 1. The light-trap mechanism 18 is adapted when closed to be resiliently pressed by a spring 22 against a frame-shaped boundary 23 of a light-transmitting opening 25 formed by the camera body to form a light seal for preventing the passage of light through the opening 25. The mechanism adapted to open the light-blocking flap 19 is a plate member 26 having an arm 27 adapted to engage a roller 28 mounted on the flap member 19 and urge the flap member upwardly exposing the light-transmitting opening 25. The plate member 26 is reciprocally mounted to the camera body 1 by two screws 29 passing through elongated slots 31 formed by the plate member, and further has a flange 32 provided with an opening for receiving a pin 33 secured to the camera body 1 for guiding the reciprocal movement of the member 26. A spring 34 is interposed between the camera body 1 and the flange 32 urging the plate member 26 downwardly as best shown in Fig. 4. The plate member 26 has a lip 35 adapted to lie in the path of an ear 36 carried by the rear portion of the lens mount 2 as seen in Fig. 2. The ear 36 is adapted to extend through an arcuate slot 37 as seen in Fig. 1 formed by the camera body 1 when the lens mount 2 is secured to the camera body. A lug 38 is further formed by the plate member 26 and is adapted upon downward movement of the plate member, such as occurs when the lens mount 2 is removed from the camera body 1 to enter a right angle recess 39 formed by surfaces 41, 42 of the dog member 13.

In the operation of this invention, let us assume initially that the operator has made an exposure and now desires to use a different lens mount 2. The lens mount is rotated in a counterclockwise direction until the fingers 3 are in alignment with the slots 4 whereupon the lens mount 2 may be withdrawn from the camera body 1. As the lens mount 2 is turned in the counterclockwise direction, the ear 36 mounted thereto moves downwardly in the slot 37 and is followed by the spring urged plate member 26. Downward movement of the plate member 26 and arm 27 permits the spring 22 to close the flap member 19 preventing the passage of light through the light transmitting camera opening 25 into contact with the light sensitive film 24. The downward movement of the plate member 26 further causes the lug 38 to enter the recess 39 and lock or block the shutter actuating mechanism by preventing pivotal movement of the dog member 13. The operator then attaches the desired lens mount 2 to the camera body by inserting the fingers 3 into the corresponding slots 4, the ear 36 into the arcuate slot 37 in a position under the lip 35 of the plate member 26, and turning the lens mount 2 in a clockwise direction. Turning the lens mount causes the ear 36 to engage the lip 35 and urge the plate member 13 upwardly against the bias of the spring 34. The upward movement of the plate member 13 causes the arm 27 to engage and urge the roller 28 upwardly moving the flap member 19 against the bias of the spring 22 to open the light transmitting opening 25. The lug 38 is withdrawn from the recess 39 to unlock the shutter actuating mechanism.

Although but one embodiment has been illustrated and described, it will be apparent to those skilled in the art that various changes and modifications may be made therein without departing from the spirit of the invention or from the scope of the appended claims.

It is claimed and desired to secure by Letters Patent:

1. In a photographic camera having a camera body and a detachable lens mount including a shutter and adapted to be secured to said camera body when turned in one direction and detached therefrom when turned in the opposite direction, the combination of: a light-trap means including a rectangularly shaped flap member hingedly mounted along one edge to said camera body and cooperating with a light-transmitting opening for excluding light from the film on removal of said lens mount from said camera body, said flap member having a roller means mounted thereon; a plate member reciprocally carried by said camera body and having an arm adapted upon reciprocal movement of said plate member to cooperate with said roller means to control movement of said flap member between light admitting and light excluding positions; a spring interposed between said camera body and said plate member normally moving said light-trap means to said light excluding position; a lip formed by said plate member; an ear carried by the rear portion of said lens mount adapted when said lens mount is placed on said camera body and turned in said one direction to engage and urge said lip and said plate member against the bias of said spring causing said arm to urge said roller means and said flap member into a position admitting light to the film; a shutter actuating mechanism carried by said camera body and including a reciprocal plunger and a pivotal dog member adapted to be pivotally moved by said plunger to actuate said shutter, said dog member provided with a latching recess; and a lug formed by said plate member adapted to be urged by said spring into said latching recess when said lens mount is turned in said opposite direction whereby said plunger and said dog member are positively latched against operation.

2. In a photographic camera having shutter actuating means, means for detachably securing a lens on said camera, and a movable light trap for excluding light from the focal plane of the camera when in a closed position and for permitting light to strike the focal plane when in an open position, an arrangement for positively blocking actuation of said shutter actuating means except when a lens is secured on the camera, said arrangement comprising light trap operating means movable between a first position releasing said light trap for movement to said closed position and a second position moving said light trap to and maintaining it in said open position, means including two elements positively engagable with each other, one carried by said lens and one carried by said light trap operating means, for causing movement of said light trap operating means to said first position upon movement of the lens from a secured position on the camera and for causing movement of said light trap operating means to said second position upon movement of the lens to a secured position on the camera, and blocking means operated by said light trap operating means and movable thereby between (a) an operative position cooperating with and positively blocking actuation of said shutter actuating means when said light trap operating means is in said first position and (b) an inoperative position unblocking said shutter actuating means when said light trap operating means is in said second position.

3. In a photographic camera having shutter actuating means, means for detachably securing a lens on said camera, and a movable light trap for excluding light from the focal plane of the camera when in a closed position and for permitting light to strike the focal plane when in an open position, an arrangement for positively blocking actuation of said shutter actuating means except when a lens is secured on the camera, said arrangement comprising a spring biased light trap operating means normally urged to a first position releasing said light trap for movement to said closed position and movable from said first position to a second position moving said light trap to and maintaining it in said open position, means including two elements positively engagable with each other, one carried by said lens and one carried by said light trap operating means, for causing movement of said light trap operating means to said first position upon movement of the lens from a secured position on the camera and for causing movement of said light trap operating means to said second position upon movement of the lens to a secured position on the camera, and blocking means carried by said light trap operating means and movable thereby between (a) an operative position cooperating with and positively blocking actuation of said shutter actuating means when said light trap operating means is in said first position and (b) an inoperative position unblocking said shutter actuating means when said light trap operating means is in said second position.

4. In a photographic camera having shutter actuating means including a pivotal dog member forming a latching recess, means for detachably securing interchangeable lenses on said camera, and a movable light trap for excluding light from the focal plane of the camera when in a closed position and for permitting light to strike the focal plane when in an open position, an arrangement for positively blocking actuation of said shutter actuating means except when a lens is secured on the camera, said arrangement comprising light trap operating means including a plate member reciprocally movable between a first position releasing said light trap for movement to said closed position and a second position moving said light trap to and maintaining it in said open position, means including two elements positively engageable with each other, one carried by said lens and one carried by said plate member, for causing movement of said plate member to said first position upon movement of the lens from a secured position on the camera and for causing movement of said plate member to said second position upon movement of the lens to a secured position on the camera, and a lug carried by said plate member and movable thereby between (a) an operative position into engagement with said latching recess for positively blocking actuation of said shutter actuating means when said plate member is in said first position and (b) an inoperative position out of engagement with said latching recess for unblocking said shutter actuating means when said plate member is in said second position.

References Cited in the file of this patent

UNITED STATES PATENTS 2,620,712   Clifford _____ Dec. 9, 1952

FOREIGN PATENTS 1,064,773   France _____ Dec. 30, 1953